(12) United States Patent
Sager et al.

(10) Patent No.: US 10,161,323 B2
(45) Date of Patent: Dec. 25, 2018

(54) BOOST-ASSISTED PURGE FLOW TECHNIQUES FOR EVAPORATIVE EMISSIONS SYSTEMS

(71) Applicants: Roger C Sager, Munith, MI (US); Ryan Sturgeon, Rochester Hills, MI (US); James Daley, Jackson, MI (US); Joseph Dekar, Jackson, MI (US); Jospeh B Unsworth, Ann Arbor, MI (US); Luis Del Rio, Ann Arbor, MI (US); Ronald A Yannone, Jr., Clinton, MI (US); Jeffrey P Wuttke, Sterling Heights, MI (US)

(72) Inventors: Roger C Sager, Munith, MI (US); Ryan Sturgeon, Rochester Hills, MI (US); James Daley, Jackson, MI (US); Joseph Dekar, Jackson, MI (US); Jospeh B Unsworth, Ann Arbor, MI (US); Luis Del Rio, Ann Arbor, MI (US); Ronald A Yannone, Jr., Clinton, MI (US); Jeffrey P Wuttke, Sterling Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 57 days.

(21) Appl. No.: 15/359,683

(22) Filed: Nov. 23, 2016

(65) Prior Publication Data

US 2018/0142631 A1 May 24, 2018

(51) Int. Cl.
*F01N 3/00* (2006.01)
*F02D 41/00* (2006.01)
(Continued)

(52) U.S. Cl.
CPC ......... *F02D 41/004* (2013.01); *F01N 3/0842* (2013.01); *F01N 3/0885* (2013.01);
(Continued)

(58) Field of Classification Search
USPC ................. 60/274, 280, 282, 283, 284, 286; 123/518, 519, 520, 528
See application file for complete search history.

(56) References Cited

U.S. PATENT DOCUMENTS 6,438,945 B1* 8/2002 Takagi .................. F01N 3/0842
123/520
7,810,475 B2* 10/2010 Peters .................. F02M 25/089
123/519
(Continued)

*Primary Examiner* — Binh Q Tran
(74) *Attorney, Agent, or Firm* — Ralph E Smith

(57) ABSTRACT

A vapor canister of an evaporative emissions (EVAP) system is configured to store fuel vapor evaporated from a liquid fuel housed in a fuel tank of a vehicle. A boost line is connected between a high-pressure side of a boost system of an engine and the vapor canister, a boost pressure control valve is disposed in-line along the boost line and configured to control an amount of boost pressure provided to the vapor canister, and a set of purge lines are connected between the vapor canister and at least one of the engine, an induction system of the engine, and an exhaust treatment system of the engine. A controller is configured to control the boost pressure control valve to control the boost pressure provided to the vapor canister to control an amount of fuel vapor forced from the vapor canister through at least one of the set of purge lines.

18 Claims, 3 Drawing Sheets

(51) Int. Cl.
  *F02M 25/08* (2006.01)
  *F02M 35/10* (2006.01)
  *F01N 3/08* (2006.01)

(52) U.S. Cl.
  CPC ...... *F02M 25/089* (2013.01); *F02M 25/0836* (2013.01); *F02M 25/0854* (2013.01); *F02M 35/10222* (2013.01)

(56) References Cited

U.S. PATENT DOCUMENTS

| | | |
|---|---|---|
| 8,019,525 B2 | 9/2011 | DeBastos et al. |
| 9,086,036 B2 | 7/2015 | Inoguchi et al. |
| 9,822,718 B2 * | 11/2017 | Pursifull .............. F02D 41/0045 |
| 2001/0011540 A1 * | 8/2001 | Mashiki .............. F02D 41/0045 |
| | | 123/520 |
| 2013/0152904 A1 | 6/2013 | Balsdon et al. |
| 2013/0220282 A1 | 8/2013 | Hadre et al. |
| 2014/0251284 A1 * | 9/2014 | Plymale ............... F02M 25/089 |
| | | 123/518 |
| 2015/0047330 A1 * | 2/2015 | Zhang ....................... F01N 3/02 |
| | | 60/311 |

\* cited by examiner

BOOST-ASSISTED PURGE FLOW TECHNIQUES FOR EVAPORATIVE EMISSIONS SYSTEMS

FIELD

The present application generally relates to evaporative emissions (EVAP) systems and, more particularly, to boost-assisted purge flow techniques for EVAP systems.

BACKGROUND

Evaporative emissions (EVAP) systems include vapor canisters that capture fuel vapor (e.g., butane), also known as "purge vapor," evaporated from liquid fuel (e.g., gasoline) housed in a fuel tank of a vehicle. The trapped fuel vapor is typically circulated into an induction system (e.g., an air box). Because the fuel vapor is highly combustible, its use during engine combustion increases engine power/efficiency. The fuel vapor is typically drawn into the induction system using engine vacuum. For boosted (supercharged or turbocharged) engines, however, there is often a positive pressure in the induction system.

Conventional EVAP systems for boosted engines utilize a hose (e.g., connected after a turbocharger) and an injector tee to create a Venturi effect that draws fuel vapor into the induction system. This Venturi effect, however, is only able to draw a small amount of fuel vapor. Conventional EVAP systems for boosted engines may therefore be incapable of obtaining a desired amount of fuel vapor in some operating scenarios. Accordingly, while such EVAP systems work well for their intended purpose, there remains a need for improvement in the relevant art.

SUMMARY

According to one example aspect of the invention, an evaporative emissions (EVAP) system is presented. In one exemplary implementation, the system includes a vapor canister configured to store fuel vapor evaporated from a liquid fuel housed in a fuel tank of the vehicle; a boost line connected between a high-pressure side of the boost system and the vapor canister; a boost pressure control valve disposed in-line along the boost line and configured to control an amount of boost pressure provided to the vapor canister; a set of purge lines connected between the vapor canister and at least one of the engine, an induction system of the engine, and an exhaust treatment system of the engine; and a controller configured to control the boost pressure control valve to control the boost pressure provided to the vapor canister to control an amount of fuel vapor forced from the vapor canister through at least one purge line of the set of purge lines.

In some implementations, the EVAP system further comprises a purge valve connected between each of first, second, and third purge lines of the set of purge lines, wherein the first purge line connects the purge valve to the vapor canister, wherein the second purge line connects the purge valve to intake ports of cylinders or directly into cylinders of the engine, and wherein the third purge line connects the purge valve to the induction system.

In some implementations, the EVAP system further comprises an exhaust purge valve disposed inline along the third purge line and configured to divert at least a portion of the fuel vapor headed to the induction system to the exhaust treatment system of the engine.

In some implementations, the exhaust purge valve is configured to provide the fuel vapor into exhaust gas in the exhaust treatment system at a point upstream from a catalytic converter. In some implementations, the controller is further configured to: detect a scavenging condition of the engine; and in response to detecting the scavenging condition, temporarily enriching the exhaust gas by introducing the fuel vapor into the exhaust gas in the exhaust treatment system at the point upstream from the catalytic converter.

In some implementations, the exhaust purge valve is configured to provide the fuel vapor into the exhaust treatment system at a point downstream from a catalytic converter and upstream from a lean nitrogen oxide (NOx) trap (LNT). In some implementations, the controller is further configured to enrich the exhaust gas to regenerate the LNT by introducing the fuel vapor into the exhaust gas in the exhaust treatment system at the point downstream from the catalytic converter and upstream from the LNT.

In some implementations, the EVAP system further comprises a purge pump disposed inline alone the first purge line and configured to pump fuel vapor from the vapor canister through the first purge line. In some implementations, the EVAP system further comprises an isolation valve disposed in a evaporation line connected between the fuel tank and the vapor canister, the isolation valve being configured to isolate the fuel tank from the boost pressure provided to the vapor canister.

According to another example aspect of the invention, a method of operating an EVAP system is presented. In one exemplary implementation, the method includes storing, in a vapor canister, fuel vapor evaporated from a liquid fuel housed in a fuel tank of the vehicle, the vapor canister being connected to a set of purge lines that connect the vapor canister to at least one of the engine, an induction system of the engine, and an exhaust treatment system of the engine; and controlling, by a controller of the vehicle, a boost pressure control valve to control an amount boost pressure provided to the vapor canister, the boost pressure control valve being disposed inline along a boost line connected between a high-pressure side of the boost system and the vapor canister.

In some implementations, the method further comprises controlling, by the controller, a purge valve connected between each of first, second, and third purge lines of the set of purge lines, wherein the first purge line connects the purge valve to the vapor canister, wherein the second purge line connects the purge valve to intake ports of cylinders or directly into cylinders of the engine, and wherein the third purge line connects the purge valve to the induction system.

In some implementations, the method further comprises controlling, by the controller, an exhaust purge valve disposed inline along the third purge line, the exhaust purge valve being configured to divert at least a portion of the fuel vapor headed to the induction system to the exhaust treatment system of the engine.

In some implementations, the exhaust purge valve is configured to provide the fuel vapor into exhaust gas in the exhaust treatment system at a point upstream from a catalytic converter. In some implementations, the method further comprises detecting, by the controller, a scavenging condition of the engine; and in response to detecting the scavenging condition, temporarily enriching, by the controller, the exhaust gas by introducing the fuel vapor into the exhaust gas in the exhaust treatment system at the point upstream from the catalytic converter.

In some implementations, the exhaust purge valve is configured to provide the fuel vapor into the exhaust treatment system at a point downstream from a catalytic converter and upstream from a lean nitrogen oxide (NOx) trap (LNT). In some implementations, the method further comprises temporarily enriching, by the controller, the exhaust gas to regenerate the LNT by introducing the fuel vapor into the exhaust gas in the exhaust treatment system at the point downstream from the catalytic converter and upstream from the LNT.

In some implementations, the method further comprises controlling, by the controller, a purge pump disposed inline alone the first purge line, the purge pump being configured to pump fuel vapor from the vapor canister through the first purge line. In some implementations, an isolation valve is disposed in a evaporation line connected between the fuel tank and the vapor canister, the isolation valve being configured to isolate the fuel tank from the boost pressure provided to the vapor canister.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
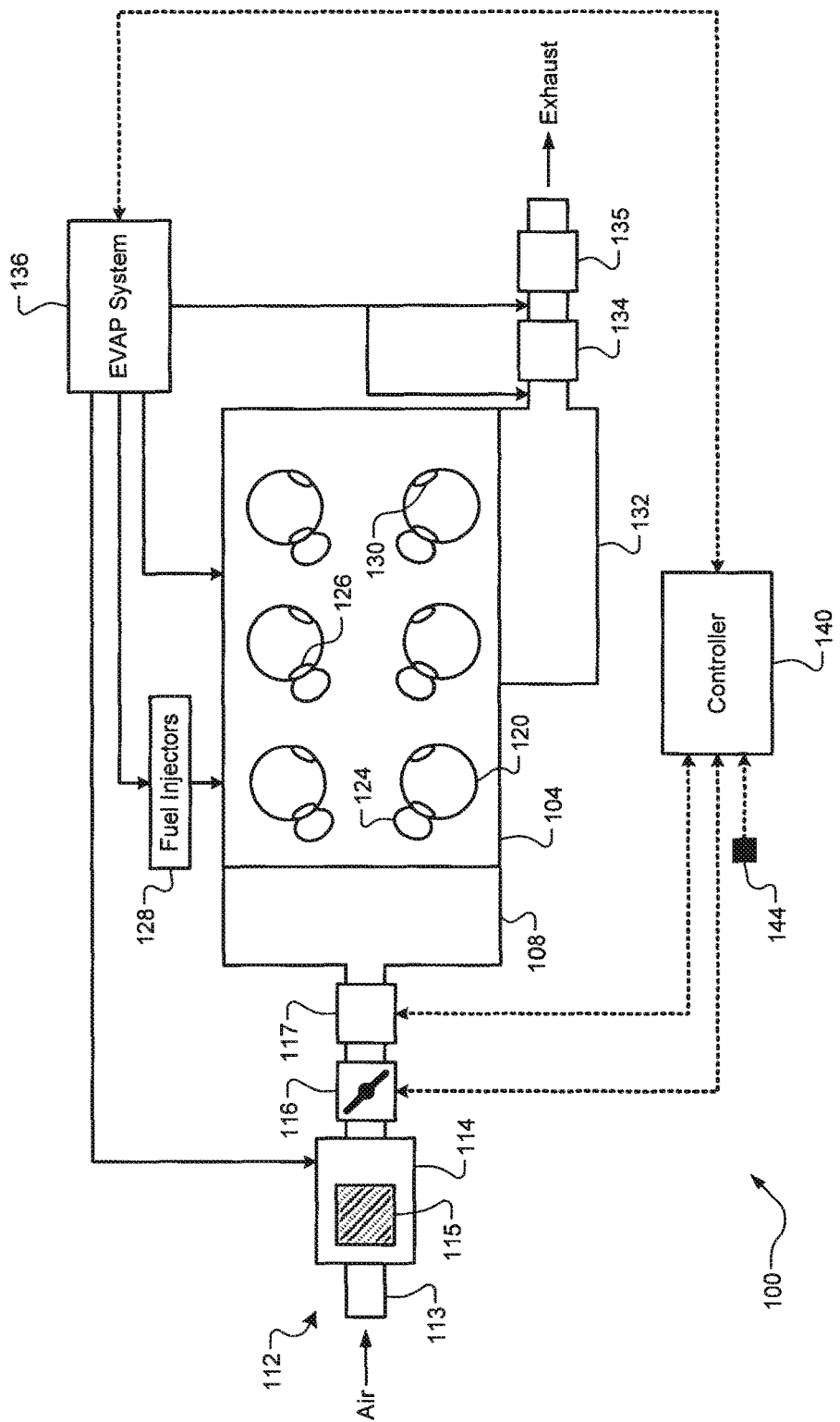
FIG. 1 is a diagram of an example engine system according to the principles of the present disclosure.

As discussed above, evaporated fuel vapor (e.g., butane) is usable to increase engine power/efficiency. Conventional EVAP systems for boosted engines, however, are unable to draw a desired amount of fuel vapor into an induction system (e.g., an air box). For example, the creation of a Venturi effect via a hose and an injector tee, as disclosed in commonly-assigned U.S. Pat. No. 8,924,133, only enables a small amount of fuel vapor to be drawn into the induction system. Accordingly, boost-assisted purge flow techniques for EVAP systems are presented. These systems/methods utilize a boost line connected between a high-pressure side of a boost system (e.g., after a turbocharger) and a vapor canister and a boost pressure control valve disposed inline along the boost line that controls an amount of boost pressure supplied to the vapor canister.

By controlling the boost pressure supplied to the vapor canister, an amount of fuel vapor forced out of the vapor canister and to a purge valve is controlled. The purge valve directs the purge vapor through one of two paths: (i) to the engine (e.g., via intake ports of cylinders or directly into the cylinders) or (ii) to the induction system (e.g., into an air box). A purge pump is also implemented to pump fuel vapor out of the vapor canister and to the purge valve. An isolation valve is also implemented to isolate a fuel tank from the boost pressure provided to the vapor canister. A controller is configured to control the boost pressure control valve, the purge valve, and the purge pump to deliver a desired amount of fuel vapor directly into the engine or to its induction system. During non-boost (vacuum) conditions, the fuel vapor is able to be drawn to the engine from the vapor canister, e.g., without the use of the purge pump.

In some implementations, an exhaust purge valve is configured to divert at least some of the fuel vapor heading to the induction system into an exhaust system. In such implementations, the controller is further configured to control the exhaust purge valve to introduce fuel vapor into exhaust gas flowing through the exhaust system. Fuel vapor introduced downstream from a catalytic converter and upstream from a lean nitrogen oxide (NOx) trap (LNT), for example, enriches the exhaust gas for LNT regeneration without having to temporarily operate the engine with a rich air/fuel mixture. During lean periods (e.g., due to high-load scavenging where intake/exhaust valve opening overlaps), fuel vapor introduced upstream from the catalytic converter enables a desired (e.g., stoichiometric) air/fuel ratio of the exhaust gas to be maintained.

In some implementations, these EVAP systems further include a hydrocarbon (HC) sensor for measuring an amount of HC in the fuel vapor flowing from the vapor canister towards the engine/induction system. By implementing the purge pump and the HC sensor, these EVAP systems are configured to supply the engine with a desired amount of fuel vapor corresponding to a desired amount of HC. This is particularly useful, for example, during engine-off periods (e.g., engine cold starts) where no engine vacuum exists to supply the fuel vapor to the engine. The controller can also control the purge pump and/or purge valves at intake ports of cylinders of the engine, such as based on the measured amount of HC in the fuel vapor, to deliver a desired amount of HC to the engine.

Referring now to FIG. 1, an example engine system 100 is illustrated. The engine system 100 includes an engine 104 that is configured to combust an air/fuel mixture to generate drive torque. The engine 104 is any suitable gasoline engine, such as a spark ignition (SI) engine. The engine 104 draws air into an intake manifold 108 through an induction system 112. In one exemplary implementation, the induction system 112 includes an intake pipe 113 and an airbox 114 comprising a filter 115. A throttle valve 116 regulates airflow from the airbox 114. A compressor of a boost system 117 compresses or forces the air into the intake manifold 108. Examples of the boost system 117 include (i) a turbocharger having an exhaust-driven turbine that powers the compressor and (ii) a supercharger where the compressor is crankshaft-driven.

The boost-side or high-pressure side of the boost system 117 is downstream from the boost system 117 (e.g., at or in the intake manifold). The air in the intake manifold 108 is distributed to a plurality of cylinders 120 via respective intake ports 124 and intake valves 126. While six cylinders are shown, the engine 104 could have any number of cylinders. Fuel injectors 128 are configured to inject liquid fuel (e.g., gasoline) via the intake ports 124 (port fuel injection) or directly into the cylinders 120 (direct fuel injection). The intake valves 126 control the flow of the air or air/fuel mixture into the cylinders 120. The air/fuel mixture is compressed by pistons (not shown) within the cylinders 120 and combusted (e.g., by spark plugs (not shown).

The combustion of the air/fuel mixture drives the pistons, which rotate a crankshaft (not shown) to generate drive torque. Exhaust gas resulting from combustion is expelled from the cylinders 120 via exhaust valves 130 and into an exhaust treatment system 132. While not shown, the cylinders 120 could also have respective exhaust ports similar to the intake ports 124. A catalytic converter 134 (e.g., a three-way catalytic converter) in the exhaust treatment system 132 treats the exhaust gas. An optional LNT or NOx adsorber 135 further treats the exhaust gas by trapping/adsorbing NOx before releasing the exhaust gas into the atmosphere. An EVAP system 136 selectively provides fuel vapor to the engine 104 via the intake ports 124. While delivery via the intake ports 124 is shown and discussed herein, it will be appreciated that the fuel vapor could be delivered to the engine 104 directly into the cylinders 120.

The EVAP system 136 includes at least a purge pump (not shown) and an HC sensor (not shown). The EVAP system 136 is controlled by a controller 140. The controller 140 is any suitable controller or control unit for communicating with and commanding the EVAP system 136. In one exemplary implementation, the controller 140 includes one or more processors and a non-transitory memory storing a set of instructions that, when executed by the one or more processors, cause the controller 140 to perform a specific fuel vapor delivery technique. The controller 140 is configured to receive information from one or more vehicle sensors 144. Examples of the vehicle sensors 144 include an ambient pressure sensor, an altitude or barometric pressure sensor, an engine coolant temperature sensor, and a key-on sensor.

Figure 2:
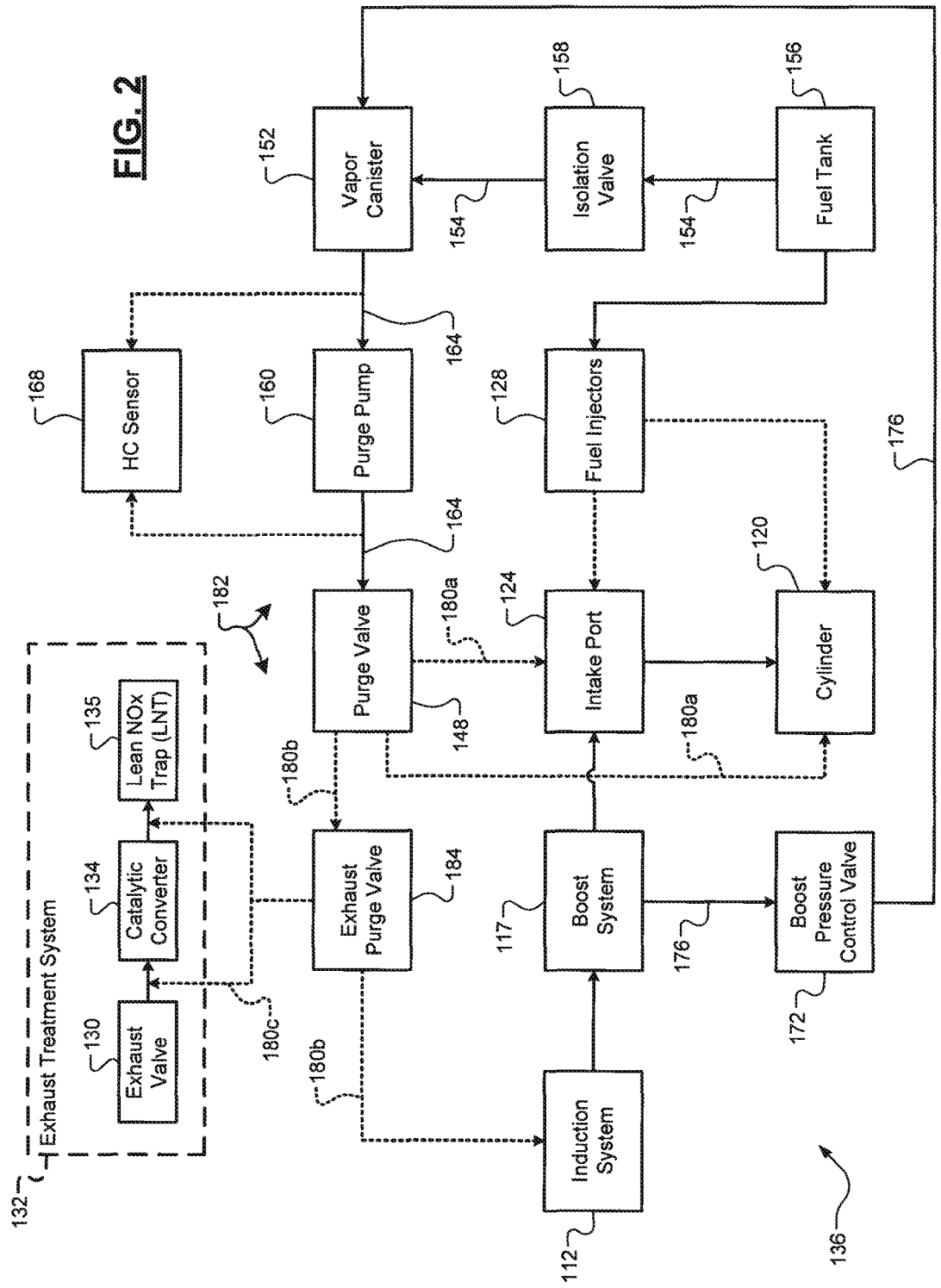
FIG. 2 is a functional block diagram of an example evaporative emissions (EVAP) system according to the principles of the present disclosure.

Referring now to FIG. 2, a functional block diagram of an example configuration of the EVAP system 136 is illustrated. While the EVAP system 136 is only shown with respect to a single intake port 124 and single cylinder 120 of the engine 104, it will be appreciated that the fuel vapor could be supplied to all of the intake ports 124 and/or cylinders 120. The EVAP system 136 is configured to deliver fuel vapor to the intake ports 124 of the engine 104 via a purge valve 148. While a single purge valve 148 is shown for controlling non-boost (naturally aspirated) fuel vapor supply to the engine 104 versus boost fuel vapor supply to the induction system 112, it will be appreciated that there could be additional purge valves (not shown) associated with each cylinder 120 or intake port 124 for cylinder-specific fuel vapor control. For example, these additional purge valves could be disposed within holes or apertures in a wall of the intake ports 124. One example of these additional purge valves is a butterfly-type valve, but it will be appreciated that any suitable valve configured to regulate the flow of pressurized fuel vapor could be utilized.

The EVAP system 136 includes a vapor canister 152 that traps fuel vapor (e.g., butane) that evaporates from liquid fuel (e.g., gasoline) housed in a fuel tank 156. This fuel vapor can be directed from the fuel tank 156 to the vapor canister via an evaporation line or duct 154. An isolation valve 158 is optionally disposed inline along the evaporation line 154 between the vapor canister 152 and the fuel tank 156. The isolation valve 158 is configured to isolate the fuel tank 156 from boost pressure provided to the vapor canister 152, which is discussed in greater detail below. In one exemplary implementation, the vapor canister 152 includes (e.g., is lined with) activated carbon (e.g., charcoal) that adsorbs the fuel vapor. While not shown, the vapor canister 152 could further include a vent device (e.g., a valve) that allows fresh air to be drawn through the vapor canister 152, thereby pulling the trapped fuel vapor with it. As previously discussed, typical EVAP systems utilize engine vacuum to draw this fresh air (and trapped fuel vapor) through the system for engine delivery.

In the illustrated EVAP system 136, a purge pump 160 is configured to selectively pump the fuel vapor from the vapor canister 152 through vapor lines 164 to the intake ports 124 (via the purge valve 148 and optional additional purge valves). This pumping could be in conjunction with or without the use of drawn fresh air through the vapor canister 152 or in conjunction with or without the use of boost pressure provided to the vapor canister 152, which is discussed in greater detail below. The purge pump 160 could be any suitable pump configured to pump the fuel vapor from the vapor canister 152 through vapor lines 164. An HC sensor 168 is disposed in the vapor lines 164 and configured to measure an amount of HC in the fuel vapor pumped by the purge pump 160. As shown, the HC sensor 168 could measure the amount of HC flowing into and/or out of the purge pump 160. The measured amount of HC is indicative of an amount of the fuel vapor that is combustible. Rather, the HC in the fuel vapor represents the highly combustible component of the fuel vapor.

The boost pressure is provided to the vapor canister 152 using a boost pressure control valve 172 connected at a high-pressure side of the boost system 117. In one implementation, for example, a boost line 176 connects the high-pressure side of the boost system 117 to the vapor canister 152 and the boost pressure control valve 172 is disposed inline along the boost line 176 and therebetween. By regulating the boost pressure provided to the vapor canister 152, the boost pressure control valve 172 controls an amount of fuel vapor that is forced out of the vapor canister through vapor lines 164. As previously mentioned, the purge valve 148 is also configured to direct the fuel vapor from vapor line 164 to the cylinder 120 or intake port 124 via a first purge line 180*a* (e.g., during non-boost conditions) or to the induction system 112 via a second purge line 180*b* (e.g., during boost conditions). The fuel vapor provided to the induction system 112, for example, could be introduced into the airbox 114 at a point downstream from filter 115 and upstream from throttle valve 116. The fuel vapor is then utilized as a portion of the air in the air/fuel charge, which enhances combustibility of the air/fuel charge.

In some implementations, an exhaust purge valve 184 diverts at least a portion of the fuel vapor headed to the induction system 112 and into a third purge line 180*c*. The third purge line 180*c* connects the exhaust purge valve 184 to a point in the exhaust treatment system 132. In one exemplary implementation, the third purge line 180*c* connects the exhaust purge valve 184 to a point upstream from the catalytic converter 134. In this implementation, the exhaust purge valve 184 controls the introduction of fuel vapor into the exhaust gas upstream from the catalytic converter 134. This is also referred to as enriching the air/fuel mixture of the exhaust gas. For purposes of this disclosure, the purge lines 180*a*, 180*b*, 180*c* (hereinafter, "purge lines 180") and, in some cases, the vapor line 164, are collectively referred to as a set of purge lines 182 because each line is providing purge from the vapor canister 152 to another component.

During lean operation periods, the air/fuel ratio of the exhaust gas is high, which is undesirable for the catalytic converter, which needs to maintain a certain operating temperature to adequately decrease emissions. One example of such a lean operating period is called scavenging, which refers to periods when opening of the intake valves 126 and exhaust valves 130 overlap. Scavenging occurs, for example, at high load operating conditions of the engine 104 (e.g., full or wide-open throttle). By introducing fuel vapor into the exhaust gas during such lean operating periods, a desired (e.g., stoichiometric) air/fuel ratio for the exhaust gas is maintained, which provides for optimal operation of the catalytic converter 134. Such a control scheme could enable the use or a smaller LNT 135 or eliminate the need for the LNT 135 altogether, which decreases costs.

In another exemplary implementation, the third purge line 180c connects the exhaust purge valve 184 to a point downstream from the catalytic converter 134 and upstream from the optional LNT 135. In this implementation, the exhaust purge valve 184 controls the introduction of fuel vapor upstream from the LNT 135. Temporary enrichment of the exhaust gas upstream from the LNT 135 is also known as regeneration of the LNT 135. More specifically, the enriched exhaust gas clears the LNT 135 of trapped NOx because the NOx desorbs and reacts with the hydrocarbons (HC) under the rich condition to produce water and nitrogen.

By utilizing the exhaust purge valve 184 for the localized introduction of fuel vapor into the exhaust gas in the exhaust treatment system 132 as described in these two scenarios, temporary periods of operating the engine 104 at a rich air/fuel ratio are avoided. This not only saves on engine fuel economy, but potentially decreases emissions further. While these two distinct/separate scenarios and a single third purge line 180c and a single exhaust purge valve 184 are discussed, it will be appreciated that both control schemes could be utilized and thus there could be two third purge lines associated with two different exhaust purge valves. It will also be appreciated that the fuel vapor could be locally introduced at other points in the exhaust treatment system 132 (e.g., depending on configuration/componentry) for the purpose of improving performance of the engine 104 and/or the exhaust treatment system 132.

As the purge valve 148 regulates the flow of the fuel vapor to the engine 104 or to the induction system 112, the controller 140 is configured to control at least one of the purge pump 160 and the purge valves 148 to deliver the desired amount of fuel vapor to the engine 104. The control of the purge pump 160 could include controlling its rotational speed. The control of the purge valves 148, on the other hand, could include controlling their angular opening. For example, there may be a high amount of HC present in highly pressurized fuel vapor in the vapor lines 164, and thus the controller 148 may primarily actuate the purge valve 148 to deliver the desired amount of fuel vapor. In many situations, however, the controller 160 will perform coordinated control of both the purge pump 160 and the purge valve 148 to deliver the desired amount of fuel vapor (e.g., a desired amount of HC) directly to the engine 104, to the induction system 112, or to the exhaust treatment system 132.

By delivering this highly combustible fuel vapor to the engine 104, combustion improves and emissions decrease. As previously discussed, the controller 140 is also configured to control the fuel injectors 128 to deliver the liquid fuel from the fuel tank 156 to the engine 104. This liquid fuel injection could be either port fuel injection or direct fuel injection. In one exemplary implementation, the controller 140 is further configured to control the fuel injectors 128 to deliver the liquid fuel from the fuel tank 156 after a period of controlling at least one of the purge pump 160 and the purge valves 148 to deliver the desired amount of fuel vapor to the engine 104. This period, for example only, could be a cold start of the engine 104.

Various preconditions could be implemented for operating the EVAP system 136. In one exemplary implementation, the controller 140 is configured to control at least one of the purge pump 160 and the purge valves 148 based on a measured ambient temperature. Another exemplary precondition is detecting a key-on event of the vehicle. For example, these preconditions could be indicative of a cold start of the engine 104. Other exemplary preconditions could also be utilized, such as the rotational speed of the purge pump 160 reaching a desired level (e.g., where adequate pumping can occur) and the HC sensor 168 being turned on. Another exemplary precondition could include the HC sensor 168 measuring an amount of HC greater than a minimum threshold for combustion by the engine 104. In other words, if there is too little HC in the fuel vapor, there could be no combustion benefit by delivering the fuel vapor to the engine 104.

Figure 3:
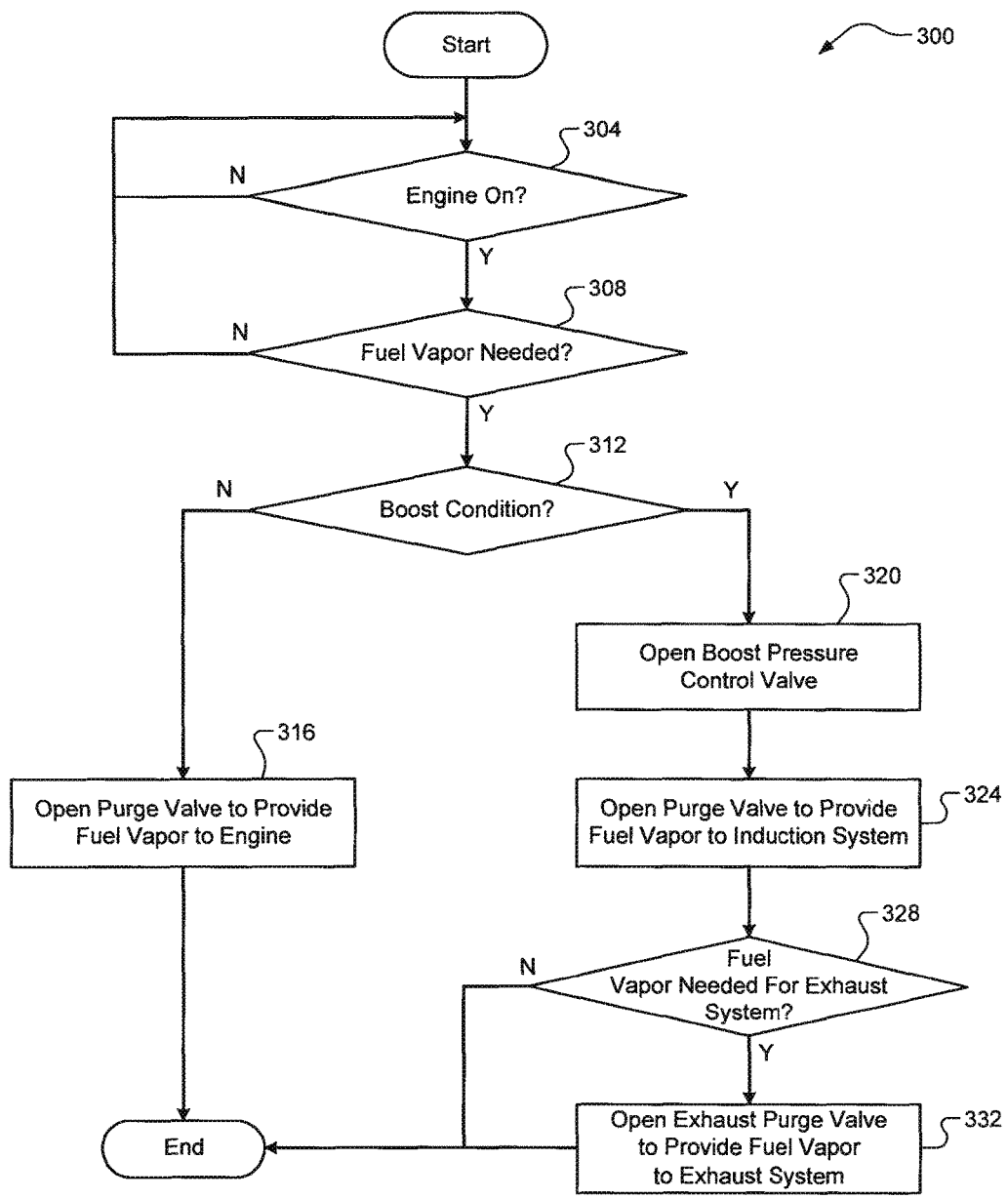
FIG. 3 is a flow diagram of an example method of operating an EVAP system according to the principles of the present disclosure.

Referring now to FIG. 3, a flow diagram of an example method 300 of operating an EVAP system (e.g., the EVAP system 136) is illustrated. At 304, the controller 140 determines whether the engine 104 is on. If true, the method 300 proceeds to 308. Otherwise, the method 300 ends or returns to 304. At 308, the controller 140 determines whether fuel vapor is needed. If true, the method 300 proceeds to 312. Otherwise, the method 300 ends or returns to 304. At 312, the controller 140 determines whether the engine 104 is operating at a boost condition. If false, the method 300 proceeds to 316 where the controller opens the purge valve 148 to provide fuel vapor directly to the engine 104 (e.g., using engine vacuum, the purge pump 160, or both) and the method 300 ends or returns to 304. If the engine 104 is operating at a boost condition, the method 300 proceeds to 320. At 320, the controller 140 opens the boost pressure control valve 172 to provide boost pressure to the vapor canister 152 via the boost line 176.

At 324, the controller 140 opens the purge valve 148 provide fuel vapor to the induction system 112. At 328, the controller 140 determines whether the fuel vapor heading to the induction system 112 is needed by the exhaust treatment system 132. In some implementations, however, the need for the fuel vapor by the induction system 112 may override the need for the fuel vapor by the exhaust treatment system 132. If false, the fuel vapor is provided entirely to the induction system 112 and the method 300 ends or returns to 304. If true, however, the method 300 proceeds to 332 where the controller 140 controls the exhaust purge valve 184 to introduce at least some of the fuel vapor into the exhaust treatment system 184 upstream from the catalytic converter 134 (e.g., during scavenging) and/or downstream from the catalytic converter 134 and upstream from the LNT 135 (e.g., for LNT regeneration).

As previously discussed, it will be appreciated that the term "controller" as used herein refers to any suitable control device, control unit, or set of multiple control devices/units that is/are configured to perform at least a portion of the techniques of the present disclosure. Non-limiting examples include an application-specific integrated circuit (ASIC), a computing device comprising one or more processors and a non-transitory memory having instructions stored thereon that, when executed by the one or more processors, cause the computing device to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An evaporative emissions (EVAP) system for a vehicle having an engine with a boost system, the EVAP system comprising:
   a vapor canister configured to store fuel vapor evaporated from a liquid fuel housed in a fuel tank of the vehicle;
   a boost line connected between a high-pressure side of the boost system and the vapor canister and configured to provide high-pressure air to the vapor canister;
   a boost pressure control valve disposed in-line along the boost line and configured to control an amount of high-pressure air flowing through the boost line and into the vapor canister to force the fuel vapor out of the vapor canister;
   a set of purge lines connected between the vapor canister and at least one of the engine, an induction system of the engine, and an exhaust treatment system of the engine; and
   a controller configured to control the boost pressure control valve to control an amount of the fuel vapor forced from the vapor canister through at least one purge line of the set of purge lines.

2. The EVAP system of claim 1, further comprising a purge valve connected between each of first, second, and third purge lines of the set of purge lines, wherein the first purge line connects the purge valve to the vapor canister, wherein the second purge line connects the purge valve to intake ports of cylinders or directly into cylinders of the engine, and wherein the third purge line connects the purge valve to the induction system.

3. The EVAP system of claim 2, further comprising an exhaust purge valve disposed inline along the third purge line and configured to divert at least a portion of the fuel vapor headed to the induction system to the exhaust treatment system of the engine.

4. The EVAP system of claim 3, wherein the exhaust purge valve is configured to provide the fuel vapor into exhaust gas in the exhaust treatment system at a point upstream from a catalytic converter.

5. The EVAP system of claim 4, wherein the controller is further configured to:
   detect a scavenging condition of the engine; and
   in response to detecting the scavenging condition, temporarily enrich the exhaust gas by introducing the fuel vapor into the exhaust gas in the exhaust treatment system at the point upstream from the catalytic converter.

6. The EVAP system of claim 4, wherein the exhaust purge valve is configured to provide the fuel vapor into the exhaust treatment system at a point downstream from a catalytic converter and upstream from a lean nitrogen oxide (NOx) trap (LNT).

7. The EVAP system of claim 6, wherein the controller is further configured to enrich the exhaust gas to regenerate the LNT by introducing the fuel vapor into the exhaust gas in the exhaust treatment system at the point downstream from the catalytic converter and upstream from the LNT.

8. The EVAP system of claim 2, further comprising a purge pump disposed inline alone the first purge line and configured to pump fuel vapor from the vapor canister through the first purge line.

9. The EVAP system of claim 1, further comprising an isolation valve disposed in a evaporation line connected between the fuel tank and the vapor canister, the isolation valve being configured to isolate the fuel tank from the boost pressure provided to the vapor canister.

10. A method of operating an evaporative emissions (EVAP) system for a vehicle having an engine with a boost system, the method comprising:
    storing, in a vapor canister, fuel vapor evaporated from a liquid fuel housed in a fuel tank of the vehicle, the vapor canister being connected to a set of purge lines that connect the vapor canister to at least one of the engine, an induction system of the engine, and an exhaust treatment system of the engine; and
    controlling, by a controller of the vehicle, a boost pressure control valve to control an amount of the fuel vapor forced from the vapor canister through at least one purge line of the set of purge lines, the boost pressure control valve being disposed inline along a boost line that is (i) connected between a high-pressure side of the boost system and the vapor canister and (ii) configured to provide high-pressure air to the vapor canister,
    wherein the boost pressure control valve is configured to control an amount of high-pressure air flowing through the boost line and into the vapor canister to force the fuel vapor out of the vapor canister.

11. The method of claim 10, further comprising controlling, by the controller, a purge valve connected between each of first, second, and third purge lines of the set of purge lines, wherein the first purge line connects the purge valve to the vapor canister, wherein the second purge line connects the purge valve to intake ports of cylinders or directly into cylinders of the engine, and wherein the third purge line connects the purge valve to the induction system.

12. The method of claim 11, further comprising controlling, by the controller, an exhaust purge valve disposed inline along the third purge line, the exhaust purge valve being configured to divert at least a portion of the fuel vapor headed to the induction system to the exhaust treatment system of the engine.

13. The method of claim 12, wherein the exhaust purge valve is configured to provide the fuel vapor into exhaust gas in the exhaust treatment system at a point upstream from a catalytic converter.

14. The method of claim 13, further comprising:
    detecting, by the controller, a scavenging condition of the engine; and
    in response to detecting the scavenging condition, temporarily enriching, by the controller, the exhaust gas by introducing the fuel vapor into the exhaust gas in the exhaust treatment system at the point upstream from the catalytic converter.

15. The method of claim 12, wherein the exhaust purge valve is configured to provide the fuel vapor into the exhaust treatment system at a point downstream from a catalytic converter and upstream from a lean nitrogen oxide (NOx) trap (LNT).

16. The method of claim 15, further comprising temporarily enriching, by the controller, the exhaust gas to regenerate the LNT by introducing the fuel vapor into the exhaust gas in the exhaust treatment system at the point downstream from the catalytic converter and upstream from the LNT.

17. The method of claim 11, further comprising controlling, by the controller, a purge pump disposed inline alone the first purge line, the purge pump being configured to pump fuel vapor from the vapor canister through the first purge line.

18. The method of claim 10, wherein an isolation valve is disposed in a evaporation line connected between the fuel tank and the vapor canister, the isolation valve being configured to be controlled to isolate the fuel tank from the boost pressure provided to the vapor canister.

* * * * *